United States Patent [19]

Beyler et al.

[11] 4,023,351
[45] May 17, 1977

[54] INJECTING AND IGNITING DEVICE

[75] Inventors: Roland Robert Charles Beyler, Levallois-Perret; Jacques Emile Jules Caruel, Dammarie-les-Lys; Jacques Eloi Pidebois, Paris; Hervé Alain Quillevere, Issy-les-Moulineaux; Michel Bernard Schenher, Paris, all of France

[73] Assignee: Societe Nationale d'Etude et de Construction de Moteurs d'Aviation, Paris, France

[22] Filed: Apr. 29, 1975

[21] Appl. No.: 572,663

[30] Foreign Application Priority Data

Apr. 30, 1974 France .................... 74.14939

[52] U.S. Cl. ............... 60/39.74 B; 60/39.82 S; 431/265; 431/266
[51] Int. Cl.² ............................ F02C 7/26
[58] Field of Search ........... 60/39.74 R, 39.74 B, 60/39.82 S, 39.82 P, 39.82 R; 431/265, 266

[56] References Cited

UNITED STATES PATENTS

| | | | |
|---|---|---|---|
| 2,831,322 | 4/1958 | Barberis | 60/39.82 P |
| 2,916,877 | 12/1959 | Walter | 60/39.74 B |
| 3,007,084 | 10/1961 | Thomasian et al. | 431/266 |
| 3,070,153 | 12/1962 | Flynn | 431/266 |
| 3,090,200 | 5/1963 | Barberis | 60/39.82 P |
| 3,558,251 | 1/1971 | Bauger et al. | 431/266 |
| 3,612,738 | 10/1971 | Jones et al. | 431/265 |
| 3,703,259 | 11/1972 | Sturgess et al. | 60/39.74 B |
| 3,937,011 | 2/1976 | Caruel et al. | 60/39.73 B |

FOREIGN PATENTS OR APPLICATIONS

| | | |
|---|---|---|
| 919,909 | 3/1947 | France |
| 1,387,041 | 3/1975 | United Kingdom |

*Primary Examiner*—Carlton R. Croyle
*Assistant Examiner*—Robert E. Garrett
*Attorney, Agent, or Firm*—William J. Daniel

[57] ABSTRACT

A device for injecting and igniting a fuel in a flow of air, comprising a tubular duct in which are generated an internal flow of rotating air and an intermediate flow containing fuel which is sandwiched between the internal flow and an external flow of rotating air, in which ignition is effected by a central electrode placed in the axis of the tubular duct and defining within the latter an annular channel which narrows around the downstream end of the central electrode to form an annular gap of uniform width along the entire extent of its circumference, in such a way that a difference in electrical potential applied between the electrode and the tubular duct causes sparks to jump between the free end of the electrode and the tubular duct across the internal flow and the intermediate flow.

3 Claims, 2 Drawing Figures

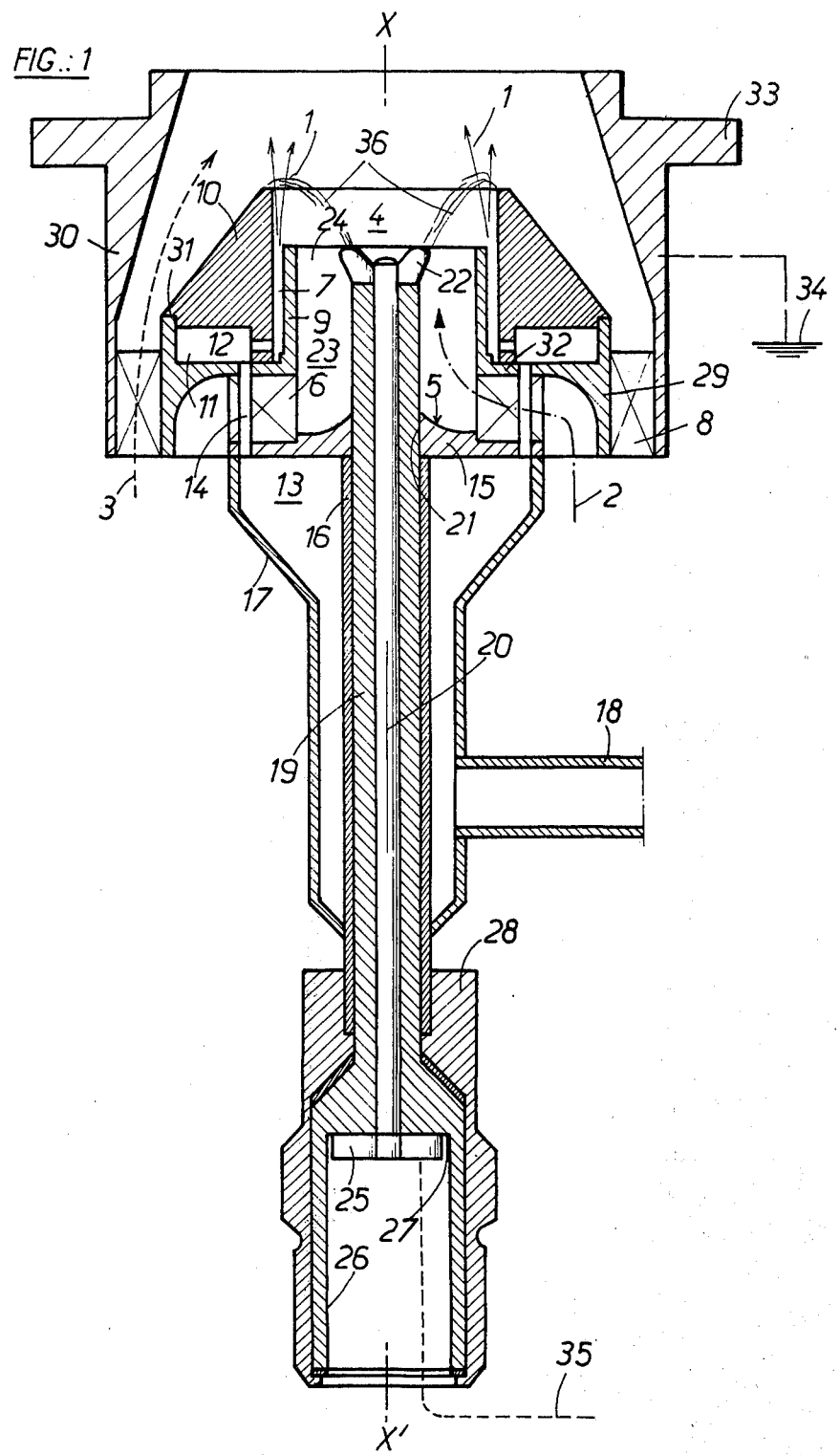

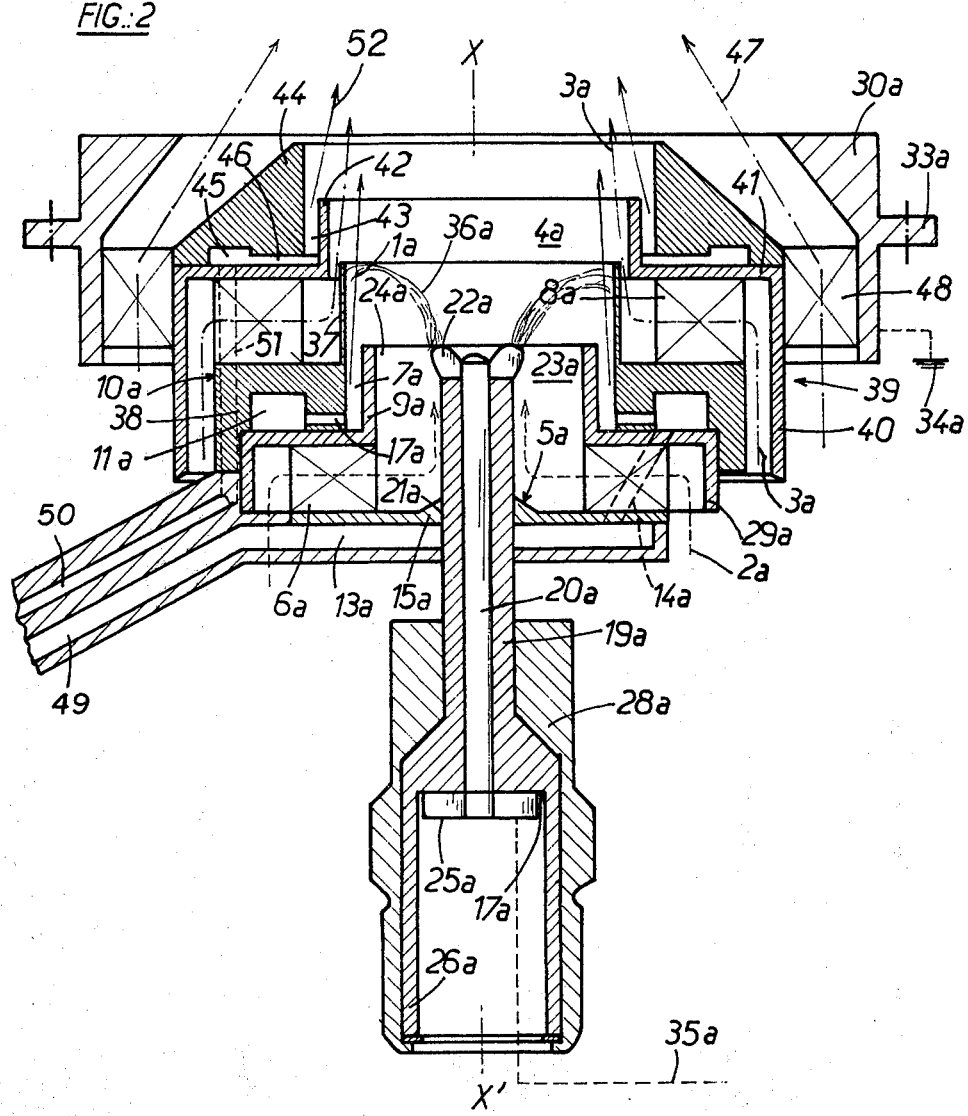

INJECTING AND IGNITING DEVICE

BACKGROUND OF THE INVENTION

The invention relates to fuel injection and ignition in combustion chambers, especially in combustion chambers of aircraft jet propulsion units.

SUMMARY OF THE INVENTION

The object of the invention is an improved injector which makes possible the abolition of the igniters habitually used, which have the drawback of producing drags in the gaseous flow in a combustion chamber, as well as the ignition injectors and the starting pump which supplies them with fuel.

The fuel injector according to the invention comprises a tubular duct in which are arranged to be generated an internal flow of rotating air and in intermediate flow containing fuel which is sandwiched between the said internal flow and an external flow of rotating air, and which is in addition provided with a central electrode placed in the axis of the said tubular duct and defining in the interior of the latter an annular channel which narrows around the free end of the said central electrode to form an annular interstice of uniform thickness throughout the whole of its circumference, means being provided to apply between the said electrode and the tubular duct a difference in electrical potential suitable for producing sparks between the said free end of the electrode and the said tubular duct across the internal flow and the intermediate flow.

BRIEF DESCRIPTION OF THE DRAWINGS

The invention will now be further described, by way of example, with reference to the accompanying drawings, in which:

FIG. 1 is a longitudinal section through a fuel injector according to the invention; and FIG. 2 is a similar view to FIG. 1, illustrating another embodiment.

DESCRIPTION OF PREFERRED EMBODIMENTS

The fuel injector illustrated in FIG. 1 is of the type in which an intermediate annular flow 1 containing fuel is sandwiched between an internal flow of air 2 and an external flow of air 3 which are caused to rotate by means of swirler blades, sometimes called "swirlers," in such a way that the two air flows exert upon the intermediate flow a shearing effect which accelerates atomisation and evaporation of the fuel. More exactly, the fuel injector illustrated in FIG. 1 is of the type described in Caruel et al., U.S. Pat. No. 3,937,011 issued Feb. 10, 1976, in which the internal air flow 2 is generated within a tubular duct 4, closed by a head 5 at its upstream end, and is caused to rotate by a centripetal blading or swirler 6 opening into this tubular duct upstream of an annular duct 7 supplied with fuel and itself opening at its downstream end into the tubular duct 4, forming a sudden enlargement in the latter, so that a mixture of air and fuel is carried downstream along the wall of the tubular duct 4 by the internal flow 2 to be subsequently sandwiched between the latter and the external air flow 3 which is flowing around the tubular duct 4. In the embodiment illustrated in FIG. 1, the external air flow 3 is caused to rotate by an axial blading or swirler 8, and the annular duct 7, which is contained between an internal cylindrical wall 9 and an annular member 10 having an approximately triangular section, is supplied with fuel from an annular chamber 11 by channels 12 which open tangentially into the annular duct 7 in such a way as to impart to the fuel, in this annular duct, a rotating movement around the axis X-X' of the injector. The annular chamber 11 is itself supplied with fuel, from a cavity 13 of the head 5, through channels 14 traversing the swirler 6.

The construction and functioning of this fuel injector are described in detail in the above mentioned U.S. Patent, which may be referred to if required.

The advantages of this injector are likewise indicated in this patent application. In particular, it enables an energetic shearing effect of the intermediate flow carrying fuel to be obtained between the internal flow and the external flow without the risk of a back flow of fuel upstream. Moreover, the fuel is destined to burn in a flow of hot gas, and the vortex created by the "swirlers" in the flow emerging from the injector can set up in this flow a zone of depression forming what is called a suction cone of the hot gases which is favourable to vaporisation of the fuel, and the heating caused by this suction phenomenon is not liable to damage the injector because the head 5 is effectively cooled by the fuel circulating in the cavity 13. This cooling also prevents the formation of carbon deposits at the centre of the injector, in co-operation with the presence of the flow 2 from the centripetal swirler 6.

The head 5 comprises a member 15 in the form of a disc of which the front face is fixed to the swirler 6, the walls of cavity 13, which consists of a cylindrical inner liner 16 arranged coaxially to the injector and welded to the rear face of the disc 15, and an outer liner 17 welded in front to this rear face and at the back to the inner liner 16. The outer liner 17 is perforated by an orifice to which is welded the end of a fuel inlet pipe 18. A ceramic insulating sleeve 19, protecting a metal rod 20, is located inside the inner liner 16 and in a hole 21 passing through the disc 15. One end of the rod 20 projects into the interior of the tubular duct 4 beyond the insulating sleeve 19 and is provided with a flared end 22 forming a deflector for the internal air flow 2 and located at the level of the downstream extremity of the cylindrical wall 9. The rod 20 and its insulating sleeve 19 define inside the tubular duct 4 an annular channel 23 which narrows around the flared end 22, foming between the latter and the cylindrical wall 9 an annular interstice 24 of uniform thickness throughout its circumference. The rear end of the metal rod 20, which is located outside the injector, is provided with a disc 25 which is mounted in a boring 26 of the ceramic sleeve 19 and rests on the bottom 27 of this boring. The rear end of the sleeve 19, in which the boring 26 is made, and the rear end of the inner liner 16 are housed in a synthetic resin block 28 in such a way as to form an end-piece adapted to receive a conventional type connector linked to a high voltage source of electricity.

The swirlers 6 and 18 consist of metal blades which are welded on one hand between the disc 15 and an annular member 29 integral with the cylindrical wall 9 and on the other hand between this member 29 and a metal cap 30 which channels externally the outer air flow 3 and which projects slightly beyond the annular member 10, as in the U.S. Patent already referred to. The annular member 10 is welded at 31 and 32 to the member 29, so that the elements 15, 6, 29, 9, 10, 8 and 30 are connected electrically to one another and to the elements 16, 17 and 18, and form a conductor assembly which is insulated from the rod 20 by the ceramic sleeve 19. The annular cap 30 is provided externally with a flange 33 by which it is mounted, as in the U.S. patent already referred to, on the front part of a combustion chamber not illustrated, so that the injector, in operation, is located in a flow of axial air which penetrates into the swirler 6 to form the internal air flow 2, which exits swirling into the annular channel 23. The flow of air also penetrates into the swirler 8 to form the external flow 3 which exits swirling around this internal air flow through the annular channel formed between members 10 and 30. The conductor assembly mentioned above being attached to the combustion chamber is earthed, as is shown schematically at 34. The connector, which is not illustrated, establishes an electrical connection, shown schematically at 35, between the metal disc 25 and the high voltage source, which is not illustrated.

The combustion chamber is ignited the usual way by operating a starter, not illustrated, connecting up the high tension source, not illustrated, and feeding the pipe 18 with fuel by means which are not illustrated. The effect of operating the starter is to set up a flow of air in the combustion chamber which produces the flows 2 and 3 in the manner already stated. The action of the high voltage source is to apply a large difference of potential between the central electrode (consisting of the disc 25, rod 20 and deflector 22) and the earth 34, so that sparks jump in the gap 24 between the deflector 22 and the metal wall 9. The plasma produced thereby is carried along by the internal flow 2 which imparts to it a swirling movement around the axis X–X' and carries it towards the front of the injector, so that it becomes elongated while curving inwards and establishes itself at 36 between the deflector 22 and the annular member 10 where it finds a calm zone favouring its attachment. Such an arrangement is favourable to combustion in certain operating conditions (acceleration of vaporisation), brings about an improvement in stability in continuous operation and allows faster acceleration. In addition, if gaseous fuels are used, it affords great safety. When the pipe 18 is fed with fuel, the latter flows into the annular duct 7 in the manner already indicated and, as in the U.S. patent already referred to, the fuel is carried beyond this annular duct 7 by the internal flow 2, forming the intermediate flow 1 which is sandwiched and laminated between the air flows 2 and 3. The shearing effect which results from this speeds up atomisation and vaporisation of the fuel and the latter is ignited by the sparks 36 which pass through the internal flow and the intermediate flow, as is shown in the drawing.

It should be noted that the presence of the central electrode and its mounting does not interfere in any way with the functioning of the injector. It is thus possible to install such an electrode in all the injectors of a combustion chamber. The various injectors may be ignited either separately or sequentially by means of a very simple distributor, for example of the type used for firing the sparking plugs of a car engine. It should also be noted that the arrangement described allows a perceptible improvement in flame propagation in the combustion chamber and a considerable broadening of the limits of stability of combustion, especially in an aircraft jet propulsion unit, because the ignition device may be made to function either continuously or only in certain operating conditions, which lessens the risk of ignition failure or malfunction at altitude.

It goes without saying that the method of constructions described is merely one example and that it could be modified, especially by substituting technical equivalents without thereby departing from the scope of the invention as defined in the claims. In particular, the axial swirler 8 could be replaced by a centripetal swirler as in the U.S patent referred to above and/or the anti-pollution qualities of the burner could be improved in accordance with the disclosure of this patent application by making the external air flow open into the tubular duct upstream of a second annular duct which can be connected to a fuel supply and which itself opens at its downstream end into the said tubular duct, forming a second sudden enlargement in the latter, and by adding a third swirler blading or swirler which causes a third air flow passing around this tubular duct to rotate.

An embodiment of this arrangement is illustrated in FIG. 2 in which the elements acting in the same way as in FIG. 1 are designated by the same reference numbers plus the index $a$. In this embodiment, the annular member 10$a$, which limits externally the annular channel 7$a$, comprises a cylindrical wall 37 joined to a body 38 in which are formed the annular chamber 11$a$ and the channels 12$a$. The external air flow 3$a$ flows between this annular member 10$a$ and another annular member 39, which consists of a first cylindrical portion 40 surrounding the body 38, an annular connecting portion 41 perpendicular to the axis X–X' and joined to the body 38 by the swirler 8$a$, and a second cylindrical portion 42 with a diameter a little larger than the cylindrical portion 37 and extending farther downstream than the latter. This cylindrical portion 42 limits internally a second annular duct 43 which is limited externally by an annular member 44, similar to the member 10 in FIG. 1 and in which is formed a second annular chamber 45 which communicates with the annular duct 43 through channels 46 opening tangentially into this annular duct. A third air flow 47, caused to rotate by a third swirler 48, flows between the member 44 and the cap 30$a$. The set of members 15$a$, 6$a$, 29$a$, 10$a$, 8$a$, 39, 44, 48 and 30$a$ forms an assembly conducting electricity which is earthed at 34$a$ and insulated from the central electrode 20$a$ by the ceramic sleeve 19$a$. The central electrode is connected at 35$a$ to the source of high voltage electricity, not illustrated. The cavity 13$a$ is supplied with fuel by a ducting system 49 independent of the central electrode, and a second ducting system 50 supplies fuel to the annular chamber 45 through a channel 51 which passes into the swirler 8$a$ and into the body 38 of member 10$a$.

The injector illustrated is intended for equipping the combustion chamber of an aircraft jet propulsion unit (not illustrated) and, as in the U.S. patent referred to above, in order to cause the enginne to idle, the ducting system 49 is supplied with fuel at a so-called idling rate; the injector then operates in the manner described with reference to FIG. 1, the intermediate flow 1$a$ being sandwiched between the internal air flow 2$a$ and the external air flow 3$a$. Ignition likewise takes place in the manner already described, the sparks which jump between the deflector 22$a$ of the internal electrode and the wall of the tubular duct 4$a$ becoming elongated and curving inward at 36$a$ to strike the cylindrical portion 37 of the annular member 10$a$ while crossing the intermediate flow 1$a$ and ensuring ignition of the fuel. To make the propulsion unit operate at the other modes, the fuel supply is increased, but it is divided between the ducting system 49 and the ducting system 50. The fuel injected by this ducting system 50 arrives, via channel 51, in the annular chamber 45, passes from there through channels 46 into the second annular duct 43, and emerges from the latter forming a second intermediate flow 52, which is sandwiched and laminated between the external air flow 3a and the third flow 47. The fuel in the flow 52 is thus atomised and vaporised and ignites on contact with the flame produced by the combustion of the first intermediate flow 1a. Combustion thus takes place in two stages, which enables more uniform combustion temperatures to be obtained and, consequently, the production of oxides of nitrogen to be reduced.

We claim:

1. A device for injecting ignited fuel into an airflow, comprising the combination of:

a jacket (10) of electrically conductive material, with a generally cylindrical inner surface having its axis (XX') generally parallel to the airflow direction, a generally cylindrical shield (9) of electrically conductive material structurally and electrically united to said jacket (10), and extending coaxially with and over a substantially smaller axial extent than said jacket cylindrical inner surface, said shield being spaced internally of an upstream section only of said cylindrical inner surface and ending with a free end short of a downstream section thereof to thereby leave said downstream section unshielded and inwardly exposed, whereby said shield (9) defines with said jacket (10) both a stepped tubular duct (4, 23) and an annular duct (7) bounded by said shield and said upstream section of said inner surface, closure means (5) fitted at the upstream end of said tubular duct (4) to bottom the same, a centripetal air swirler (6) leading into said tubular duct (4) and fitted upstream of said shield (9), means (29) tapping air from said airflow to feed said centripetal air swirler (6) thereby producing an inner whirl of air (2) through said stepped tubular duct (4, 23) towards the downstream end of said jacket (10), means (8) for producing an outer whirl of air (3) around said jacket (10) towards the downstream end of said jacket (10), duct means (18, 17, 14, 11, 12) for supplying fuel to said annular duct (7), a rod (20) of electrically conductive material having a flared operative end (22) projecting into said tubular duct (4) adjacent to but inwardly spaced from said free end of said shield (9) to define therewith a first annular spark gap (24) and further with said unshielded downstream section of said jacket (10) a second annular spark gap (36) which overrides said first annular spark gap (24), means (19) for electrically insulating said electrically conductive rod (20) with respect to said electrically conductive jacket-and-shield assembly (10-9), and means (35) for applying a spark generating voltage across said first and second annular spark gaps (24, 36).

2. A device as claimed in claim 1, wherein said electrically insulating means (19) comprises a sheath of insulating material surrounding said electrically conductive rod (20) and holding the same across said closure means (5) bottoming said tubular duct (4), and said rod (20) has a terminal end (25) opposite to said flared operative end (22) and located outside said tubular duct (4), said spark generating voltage applying means (35) being connected to said terminal end (25).

3. A device as claimed in claim 2, wherein said fuel supplying duct means comprises in successive series flow relation: a fuel inlet (18), an annular chamber (17) extending around said insulated rod-and-sheath assembly (20-19) and bottomed by said closure means (5), passage means (14) across said centripetal swirler (6), a manifold (11), and a plurality of channels (12) opening tangentially into said annular duct (7).

* * * * *

UNITED STATES PATENT AND TRADEMARK OFFICE
CERTIFICATE OF CORRECTION

PATENT NO. : 4,023,351
DATED : May 17, 1977
INVENTOR(S) : Roland Robert Charles Beyler et al It is certified that error appears in the above-identified patent and that said Letters Patent are hereby corrected as shown below:

In the Claims:

Claim 1, line 13 (column 5, line 28), "and" should be -- end --.

Signed and Sealed this twenty-sixth Day of July 1977

[SEAL]

Attest:

RUTH C. MASON
*Attesting Officer*

C. MARSHALL DANN
*Commissioner of Patents and Trademarks*